United States Patent [19]

Ivy

[11] Patent Number: 4,506,411
[45] Date of Patent: Mar. 26, 1985

[54] GAME SKINNING APPARATUS

[76] Inventor: James R. Ivy, 9001 Glacier #138, Texas City, Tex. 77590

[21] Appl. No.: 565,372

[22] Filed: Dec. 27, 1983

[51] Int. Cl.³ .......................... A22C 1/00; A22B 5/16
[52] U.S. Cl. ..................................... 17/44.3; 17/1 A;
17/21; 294/79; 294/104
[58] Field of Search ............... 294/79, 104, 80; 17/44,
17/44.2, 44.3, 44.4, 44.1, 21, 1 A, 24

[56] References Cited

U.S. PATENT DOCUMENTS

| 749,318 | 1/1904 | Morris | 294/104 |
|---|---|---|---|
| 2,448,421 | 8/1948 | Davis | 17/44.1 |
| 2,622,914 | 12/1952 | Elling et al. | 294/79 |
| 3,137,030 | 6/1964 | Varner | 294/79 X |
| 3,194,599 | 7/1965 | Ambill | 17/44.2 X |
| 3,570,049 | 3/1971 | Muckelrath | 294/79 X |

FOREIGN PATENT DOCUMENTS 42922  4/1888  Fed. Rep. of Germany ....... 17/1 A

*Primary Examiner*—Willie G. Abercrombie
*Attorney, Agent, or Firm*—Arnold, White & Durkee

[57] ABSTRACT

A game skinning rack comprising a generally rectangular board having notches formed in each upper corner thereof, cam means pivotally mounted in each of said notches for tightly gripping the extremities of an animal to be skinned with a pressure that increases with pull, and a fixed spool and a laterally shiftable spool movable between several spaced positions with respect to said fixed spool for snugly engaging and holding the neck of the animal to be skinned. A bracket for mounting the rack to a tree or post also is disclosed.

9 Claims, 5 Drawing Figures

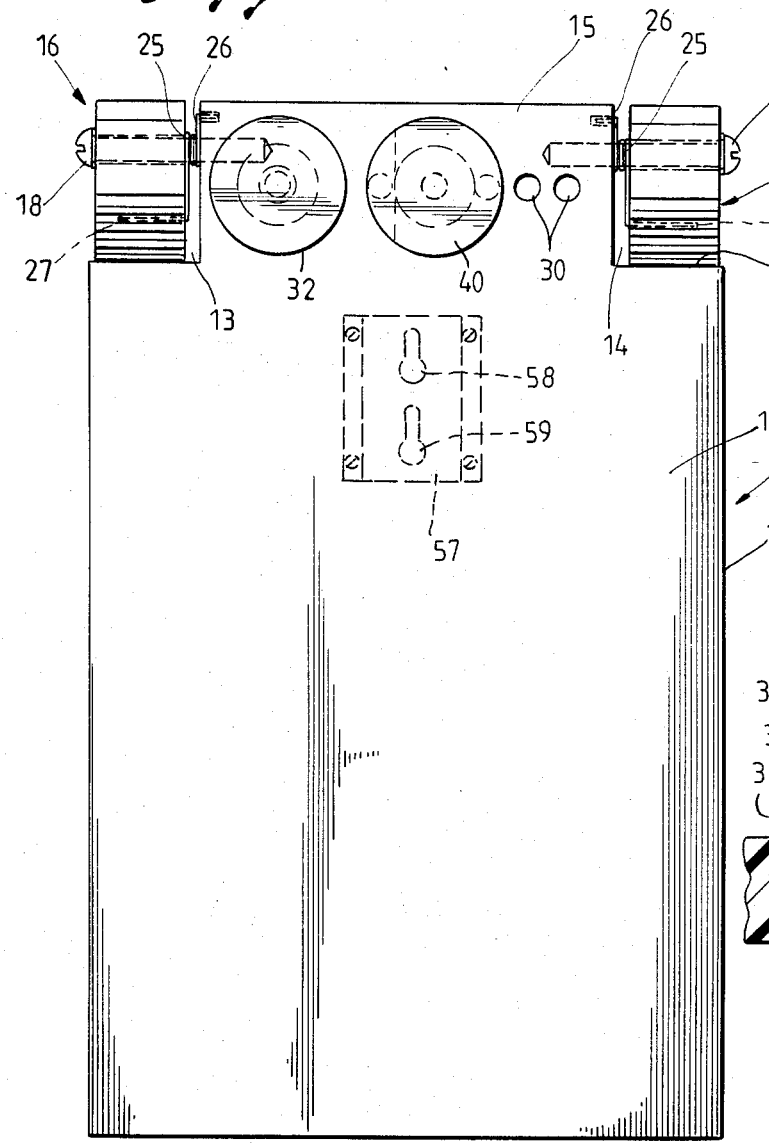
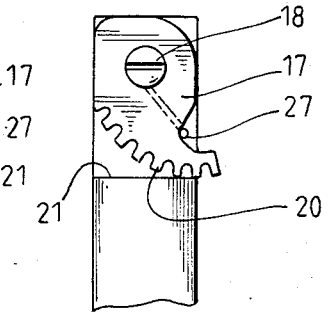
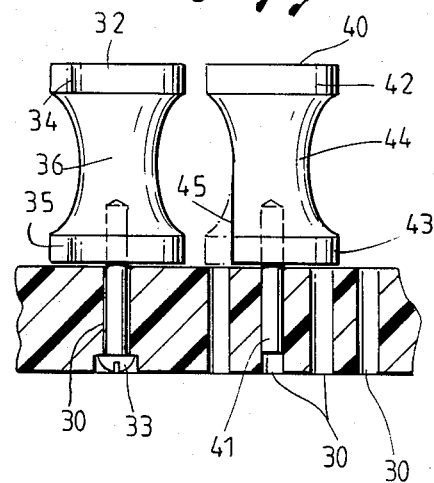
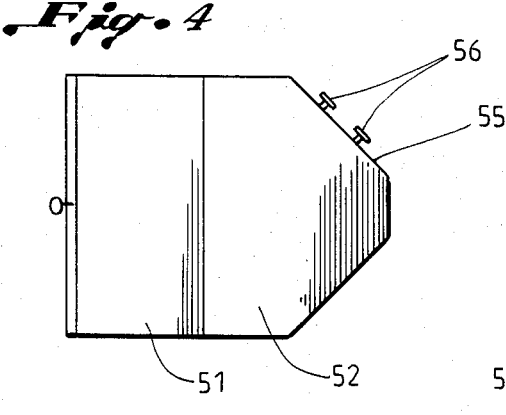
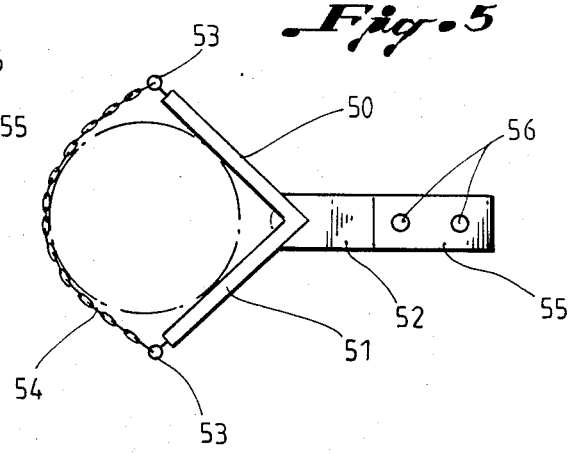

GAME SKINNING APPARATUS

FIELD OF THE INVENTION

This invention relates generally to a game skinning apparatus, and particularly to a game skinning rack having new and improved mechanisms for releasably holding the animal in various positions on the rack during skinning.

BACKGROUND OF THE INVENTION

The skinning of a small game animal such as a squirrel or the like traditionally has been a somewhat onerous task that has required two persons—one to hold the animal while the other does the skinning. In typical fashion, the holder grasps the hind feet while the skinner makes an incision on the lower side of the tail. Then the tail is severed while leaving a strip of skin intact on the upper side. While pulling on the skin and working with both a knife and his fingers, a downward diagonal cut is made by the skinner on each side of the animal, after which he grips the skin with both hands and starts to pull on the same while the other person struggles to hang onto the hind feet of the animal. Eventually the skin is pulled over the head of the animal, whereupon the holder changes to a position holding the head while the skinner removes the skin from the belly and the hindquarters.

As can readily be ascertained from the foregoing description, such prior skinning practices have involved a number of disadvantages. Two persons have been required to accomplish the skinning with any degree of success, and the process has been time consuming and dangerous to some extent. The manual holding of the animal has been difficult since the carcass is insecure, and the hide and meat of the animal can be damaged in an undesirable manner.

It is the general object of the present invention to provide a new and improved game skinning rack that includes means for securely holding the animal during the skinning process.

Another object of the present invention is to provide a new and improved game skinning rack that can be securely mounted in a way such that only one person can accomplish skinning in a quick and efficient manner.

Yet another object of the present invention is to provide a new and improved game skinning rack that enables skinning to be done safely and without substantial damage to the hide or the meat of the animal.

SUMMARY OF THE INVENTION

These and other objects are attained in accordance with the concepts of the present invention through the provision of a game skinning rack comprising a generally rectangular board preferably made of an injection molded plastic and having notches formed in each upper corner thereof. A cam gripping member is pivotally mounted in each notch and has a serrated peripheral surface that faces the bottom surface of the notch. The feet of the animal to be skinned are positioned between the respective gripping members and notch bottoms, and the gripping members are arranged such that the serrated surfaces engage the feet with a pressure that increases with the amount of pull applied to the legs. A spool assembly that is located in the central upper region of the board between the notches includes a fixed spool and a laterally shiftable spool. The neck of the animal is positioned between the spools, and the latter spool is shifted and fixed in a position where the spools snugly engage the neck of the animal to enable pulling on the body in a direction parallel to the board. Various mounting brackets may be used to secure the board on a post or other stand at an angle that is convenient to the user.

In use, a squirrel or the like is placed on the board, head and belly down, and each rear foot is placed under a cam gripper at the top of the board. As downward forces are applied that are parallel to the board and at right angles to the cam grippers, increased forces result in a tighter gripping action on the feet. After the skin has been pulled over the head of the animal, the body is rotated and placed on the board with back down and neck between the spools. The laterally shiftable spool then is moved into snug contact with the neck to ensure that the head is held securely, enabling the skinning job to be finished.

BRIEF DESCRIPTION OF THE DRAWINGS

The present invention has other objects, features, and advantages which will become more clearly apparent in connection with the following detailed description of a preferred embodiment, taken in conjunction with the appended drawings in which:

FIG. 1 is a front view of a game skinning rack in accordance with this invention;

FIG. 2 is a fragmentary side view of a cam gripping member;

FIG. 3 is a fragmentary side view showing the construction of the fixed and adjustable spools; and FIGS. 4 and 5 are respective side and top views of a mounting bracket for the board of FIG. 1.

DETAILED DESCRIPTION OF A PREFERRED EMBODIMENT

Referring initially to FIG. 1, a game skinning rack 10 that is constructed in accordance with the present invention includes a rectangular board 11 having a front working surface 12. The board 11 is shown as having a rectangular shape, however other elongated or oblong shapes can be employed as will be apparent to those skilled in the art. The board 11 can be made of any suitable material, but preferably is formed of an injection molded plastic. Notches 13 and 14 are provided in the board 11 at the respective upper corners thereof, leaving a central region 15 of substantial width.

Gripping members 16 and 17 are pivotably mounted in the respective notches 13 and 14 by means of screws 18 or the like that extend through holes in the members and into the sides of the central region 15. As shown in FIG. 2, which is a side view of the gripping member 17, each member has the general shape of cam that has a curved lower periphery formed with an increasing pitch with respect to the hole through which the screw 18 passes. The lower periphery of the member 17 is provided with outwardly projecting serrations or teeth 20 which confront the lower surface 21 of the notch 14 in order to securely grip the foot of an animal when the foot is positioned between the cam gripping member and the lower surface of the notch. It will be recognized that due to the cam shape of the gripping member, the teeth 20 will engage and grip the animal foot and provide a holding action that increases with increased pull on the animal's legs. Each of the gripping members preferably is spring loaded by a torsion spring 25 that is coiled around the shank of the screw 18, with one bent end portion 26 being engaged in a recess in the side of the notch 14, and another bent end portion 27 engaging a back surface of the member 17 below the level of the pivot pin 18. In this mamner, each of the gripping members is yieldably urged toward a gripping position with respect to the bottom surfaces of the notches 13 and 14.

A holding mechanism that is used to hold the neck of the animal preferably is located in the central region 15 of the board 11 which is provided with a plurality of laterally spaced holes 30 that are arranged in a row. In one embodiment a fixed spool 32 is mounted on the lefthand side of the central region 15 by means of a screw 33 (FIG. 3) that extends through one of the holes 30 and into the lower portion of the spool. Of course other suitable attachment means can be used. If desired, the screw attachment can be somewhat loose so that the spool 32 can rotate, however the spool is otherwise fixed against lateral movement. The spool 32 has upper and lower lips 34, 35 and a reduced diameter central portion 36 having a concave outer periphery.

Another spool 40 is arranged to be mounted in various laterally spaced positions with respect to the fixed spool 32. Although the means to position the spool 40 can take various forms, as shown in FIG. 3, one suitable means can be a pin 41 that protrudes from the bottom of the spool and which is sized to fit snugly into any one of the holes 30 in the board 11. Of course the selection of a particular hole 30 for insertion of the pin 41 determines the amount of lateral spacing between the spools 32 and 40, which enables the user to adjust the spacing to provide a snug engagement of the spools with the neck of the animal being skinned. The spool 40 also has upper and lower lips 42 and 43 and a reduced diameter central portion 44 with a concave outer periphery.

To enable the spool 40 to be readily positioned with a spacing that ensures snug engagement with the sides of the animal's neck, it is preferred that a portion of the bottom lip 43 be removed as shown in FIG. 3, leaving a flat wall surface 45 that extends from the mid-portion of the spool to the lower end surface thereof. With one side of the neck of the animal in place against the fixed spool 32, the spool 40 is positioned with the flat wall surface 45 initially facing toward the left so that the cut-away portion of the bottom lip 43 provides clearance that enables the spool to be positioned as closely as possible to the fixed spool 32. Then the spool 40 is rotated at least 90° in the counterclockwise direction to an orientation such that an uncut portion of the bottom lip 43 is opposite the lower lip 35 of the spool 32 as shown in phantom lines in FIG. 3. In this position, the neck of the animal is firmly restrained by virtue of snug engagement with the concave side wall surfaces of both spools.

A preferred form of mounting bracket for securely fixing the skinning rack to a tree or post or the like is shown in FIGS. 4 and 5. Side members 50 and 51 are appropriately fixed to an outwardly extending member 52 to form an assembly having the general shape of a "Y". Eyes 53 are attached to the rear edges of the side members 50, 51 and are arranged for attachment to a chain 54 which extends around the tree and holds the members snugly thereagainst. The outwardly extending member 52 is provided with a face 55 that extends at an angle of approximately 45° to the horizontal, and a pair of spaced screws 56 are located in the face with their heads protruding above the face. A metal plate 57 (shown in dash lines in FIG. 1) having spaced keyhole slots 58, 59 is attached by suitable means to the rear of the board 10 near the upper region 15 thereof, with the slots 58, 59 being appropriately spaced to receive the heads of the screws 56. In order to releasably attach the board 10 to the mounting bracket, the board is positioned so that the screw heads enter the enlarged portions of the slots 58, 59, and then the board is pulled downward to engage the screw heads behind the narrow portions of the slots. With the mounting bracket secured to a tree or post, the skinning rack will be positioned at a very convenient angle for use. Of course other means for attaching the board to the mounting bracket will be readily apparent to those skilled in the art, with the particular embodiment shown herein being merely illustrative.

OPERATION

In use of the skinning rack of the present invention, the board 10 is attached to the mounting bracket as described above. The squirrel or other animal to be skinned is placed on the working surface 12 of the board 10 head and belly down. The back feet are placed under the respective gripping members 16 and 17, which grip the feet with a pressure that increases in response to downward pulling force applied by the skinner during the skinning operation.

After the skin has been pulled over the head of the animal, the back feet are released from the cam grippers 16 and 17, and the carcass is inverted on the board 11 with its back down and its neck between the spools 32 and 40. The movable spool 40 is then positioned in snug contact with the neck to ensure that the head is held securely by both spools. Then the skinning job can be finished.

Although the gripping members 16, 17 have been shown as being located at the respective upper corners of the board 11, they could be mounted side-by-side and located in a wide notch in the center of the upper edge of the board, or in a wide notch at either one of the upper corners of the board. In the case where the gripping members are centrally located, the holding mechanism comprising the spools 32 and 40 would then be arranged on the board 11 below the gripping members. In an arrangement where both gripping members are pivotally mounted at one of the upper corners of the board 11, of course the holding mechanism would be located on the board to the side of the gripping members. Although one spool is fixed and the other is movable in the embodiment of the present invention shown in the drawings, it will be appreciated that both spools could be movable and still accomplish the objects of the present invention. Moreover, the fixed spool can be the one on either the right or the left hand side of the board, which ever is the more convenient to the use.

It now will be realized that a new and improved game skinning rack has been disclosed that has a number of advantages over the prior art. The construction allows one person to accomplish the skinning of an animal more quickly and easily than has been done in the past where procedures required two people. The back feet of the animal are held securely at the start of the skinning process, and the head is held securely while the process is being completed. Full length support is provided during evisceration, and of course the skinning board also serves as a cutting board. The rack is quite sturdy and of practical design, and can be readily mounted in a position that is convenient to the user. Of course the rack can be constructed in various sizes for different game. Since certain changes or modifications will become apparent to those skilled in the art without departing from the inventive concepts involved, it is the aim of the appended claims to cover all such changes and modifications falling within the true spirit and scope of the present invention.

What is claimed is:

1. A game skinning rack comprising:
   an elongated board;
   cam means pivotally mounted on said board for gripping the extremities of an animal to be skinned; and
   holding means positioned on said board and arranged to engage the neck of the animal, said holding means comprising a pair of spools and means for mounting said spools in any one of a plurality of laterally spaced positions with respect to one another where side surfaces of said spools snugly engage the neck of the animal.

2. The skinning rack of claim 1, wherein said cam means includes a pair of eccentrically mounted members having gripping surfaces arranged to engage the feet of the animal to be skinned.

3. The skinning rack of claim 2, wherein said mounting means includes elements on said spools that can be inserted into openings in said board to adjust the lateral spacing of said spools to a selected distance.

4. The skinning rack of claim 1 wherein each of said spools has upper and lower lips and a concave outer periphery extending between said lips, a portion of the lower lip of one of said spools being removed to provide clearance when engaging the spools with the neck of the animal.

5. A skinning rack comprising:
   a generally rectangular board having notches at each upper corner thereof;
   cam means pivotally mounted in each notch for gripping an extremity of an animal to be skinned; and
   holding means positioned on said board between said cam means and arranged to engage the neck of the animal, said holding means comprising a fixed spool and an adjustable spool movable laterally between various positions with respect to said fixed spool, said spools being arranged to fit snugly against and thereby secure the neck of the animal to be skinned.

6. The skinning rack of claim 5, wherein each cam means includes an eccentrically mounted member having a curved lower surface with serrated edges arranged in opposing relationship to the lower surface of said notch, and spring means tending to pivot said member toward a position where said edges engage said lower surface.

7. The skinning rack of claim 6, including first means for mounting said fixed spool in a stationary position on said board, and second means for mounting said adjustable spool for movement between a selected one of several positions in spaced-apart relation to said fixed spool, said second mounting means including a plurality of holes formed in a row in said board, and pin means on said adjustable spool arranged to engage in one of said holes for locating said adjustable spool in a selected position.

8. The skinning rack of claim 7, wherein each of said spools has upper and lower lips and a concave outer periphery extending between said lips, a portion of the lower lip of said adjustable spool being removed to provide clearance when positioning said adjustable spool adjacent the neck of the animal being skinned.

9. The skinning rack of claim 1, further including means for mounting said board to a tree or post or the like, said mounting means including a Y-shaped assembly having an outwardly extending portion, releasable means for mounting said assembly to said tree, said outwardly extending portion having a surface that extends at an angle with respect to horizontal, and means for releasably attaching said board to said surface.

* * * * *